(12) United States Patent
Kaufmann et al.

(10) Patent No.: US 7,793,752 B2
(45) Date of Patent: Sep. 14, 2010

(54) METHOD OF DETERMINING BOOST DIRECTION IN A POWER STEERING SYSTEM

(75) Inventors: Timothy W. Kaufmann, Frankenmuth, MI (US); Joel E. Birsching, Vassar, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 255 days.

(21) Appl. No.: 11/810,572

(22) Filed: Jun. 6, 2007

(65) Prior Publication Data

US 2007/0240929 A1    Oct. 18, 2007

Related U.S. Application Data

(63) Continuation-in-part of application No. 11/122,337, filed on May 5, 2005, now Pat. No. 7,364,006.

(51) Int. Cl.
B62D 5/06 (2006.01)

(52) U.S. Cl. ................. 180/441; 180/421; 180/422; 701/41

(58) Field of Classification Search .......... 180/421, 180/422; 701/41, 42
See application file for complete search history.

(56) References Cited

U.S. PATENT DOCUMENTS

| | | | |
|---|---|---|---|
| 3,022,772 A | 2/1962 | Zeigler et al. | |
| 4,212,366 A | 7/1980 | Ohtuka et al. | |
| 4,454,801 A | 6/1984 | Spann | |
| 4,760,892 A | 8/1988 | Duffy | |
| 4,828,067 A | 5/1989 | Duffy | |
| 4,940,103 A | 7/1990 | Momiyama | |
| 5,119,898 A | 6/1992 | Eckhardt et al. | |
| 5,372,214 A | 12/1994 | Haga et al. | |
| 5,392,875 A | 2/1995 | Duffy | |
| 5,457,631 A | 10/1995 | Momose | |
| 5,600,955 A | 2/1997 | Sahinkaya | |
| 5,738,182 A | 4/1998 | Birsching et al. | |

(Continued)

FOREIGN PATENT DOCUMENTS

DE    4040003 A1    1/1992

OTHER PUBLICATIONS

European Search Report and Office Action dated Jan. 12, 2010 for European Application No. 08155692.0.

*Primary Examiner*—Lesley Morris
*Assistant Examiner*—Tashiana Adams
(74) *Attorney, Agent, or Firm*—Cantor Colburn LLP

(57) ABSTRACT

A method of determining a direction of a power boost applied to a power cylinder of a variable effort power steering system includes measuring a pressure of a hydraulic fluid between a pump and a control valve. A first position of the hand wheel is detected and initialized when the pressure is within a predefined equilibrium pressure range. A second position of the hand wheel is detected in response to rotational movement of the hand wheel. The first position and the second position of the hand wheel are measured in cumulative degrees rotated left or right of a on-center orientation of the hand wheel. The second position is subtracted from the first position to obtain a differential value representing the direction of the power boost. A negative differential value represents a first direction and a positive differential value represents a second direction of the power boost.

25 Claims, 3 Drawing Sheets

U.S. PATENT DOCUMENTS

| | | |
|---|---|---|
| 5,904,222 A | 5/1999 | Liubakka et al. |
| 5,975,232 A | 11/1999 | Komatsu et al. |
| 6,167,334 A | 12/2000 | Liubakka et al. |
| 6,298,940 B1 | 10/2001 | Bohner et al. |
| 6,345,682 B1 | 2/2002 | Schoffler et al. |
| 6,390,228 B2 | 5/2002 | Serizawa et al. |
| 6,408,977 B1 | 6/2002 | Obertrifter et al. |
| 6,474,437 B1 | 11/2002 | Elser et al. |
| 6,880,668 B2 | 4/2005 | Sakaki et al. |
| 2001/0032750 A1 | 10/2001 | Serizawa et al. |
| 2002/0170769 A1 | 11/2002 | Sakaki et al. |
| 2005/0161278 A1 | 7/2005 | Harnischfeger et al. |
| 2005/0236220 A1 | 10/2005 | Soeda et al. |
| 2006/0081410 A1 | 4/2006 | Phillips |
| 2006/0086087 A1 | 4/2006 | Phillips |
| 2006/0175121 A1 | 8/2006 | Birsching et al. |
| 2006/0243518 A1 | 11/2006 | Kobayashi |
| 2006/0249326 A1 | 11/2006 | Birsching et al. |

METHOD OF DETERMINING BOOST DIRECTION IN A POWER STEERING SYSTEM

CROSS REFERENCE TO RELATED APPLICATION

This application is a continuation-in-part of prior non-provisional patent application Ser. No. 11/122,337, filed on May 5, 2005, now U.S. Pat. No. 7,364,006, the advantages and disclosure of which are herein incorporated by reference.

BACKGROUND OF THE INVENTION

1. Field of the Invention

The subject invention generally relates to a variable effort power steering system for a vehicle, and more specifically to a method of determining a direction of a power boost applied to a power cylinder of the power steering system.

2. Description of the Prior Art

Power steering systems typically include a pump, a control valve, a power cylinder, and a reservoir, all interconnected by a plurality of fluid lines. The pump draws a hydraulic fluid from the reservoir and supplies the hydraulic fluid to the control valve. The power cylinder includes a first fluid chamber and a second fluid chamber. During steering maneuvers, the control valve selectively directs the fluid to one of the first fluid chamber via a first fluid line or the second fluid chamber via a second fluid line to provide the power boost (a power assist force) to the power cylinder to assist a driver in the steering maneuver. Alternatively, if no steering maneuver is currently being performed, the control valve directs an equal pressure of the hydraulic fluid to both the first and second fluid chambers of the power cylinder.

Variable effort power steering systems alter a required steering effort to steer a hand wheel (steering wheel) of the vehicle as a road speed of the vehicle changes. The variable effort steering systems increase the required steering effort at higher road speeds to increase a road feel, and lower the required steering effort at lower road speeds to help a driver turn the hand wheel.

The control valve in a variable effort power steering system regulates the power boost applied to the power cylinder by varying the pressure of the hydraulic fluid directed into either the first or second fluid chambers, thereby affecting the required steering effort as is well known in the art. In the variable effort power steering systems, a controller determines the required steering effort based on the road speed of the vehicle, and signals the control valve to increase or decrease the pressure of the hydraulic fluid directed to the first and second fluid chambers of the power cylinder to increase or decrease the power boost provided by the power cylinder. United States Published Patent Application 2006/0249367A1, Ser. No. 11/122,337, published on Nov. 9, 2006, and assigned to Delphi Technologies, Inc., the assignee of the this application, discloses such a variable effort steering system.

In order to operate the variable effort power steering system, the controller must receive information relating to the magnitude of the power boost being applied to the first and second fluid chambers in the power cylinder and to the direction of the power boost, i.e., which one of the first and second fluid chambers the power boost is being applied. The controller utilizes this information to calculate a change in the power boost applied to the first and second fluid chambers of the power cylinder to vary the required steering effort. Typically, a first pressure sensor is in fluid communication with the first fluid line connecting the control valve and the first fluid chamber for sensing the power boost being applied to the first fluid chamber, and a second pressure sensor is in fluid communication with the second fluid line connecting the control valve and the second fluid chamber for sensing the power boost being applied to the second fluid chamber. The first pressure sensor and the second pressure sensor send their respective sensed pressures in the first and second fluid chambers to the controller. The controller compares the pressure from each of the first and second pressure sensors to determine in which direction the power boost is being applied. In other words, if the first pressure sensor in fluid communication with the first fluid chamber senses a fluid pressure that is higher than the second pressure sensor in fluid communication with the second fluid chamber, than the controller determines that the control valve is directing the power boost toward the first fluid chamber at the pressure sensed by the first pressure sensor. Likewise, if the first pressure sensor senses a pressure less than the second pressure sensor, than the controller determines that the control valve is directing the power boost toward the second fluid chamber at the pressure sensed by the second pressure sensor.

It would be desirable to eliminate one of the pressure sensors in the variable effort power steering system, while still maintaining the capability to calculate the direction and magnitude of the power boost applied to the first and second fluid chambers. Eliminating one of the pressure sensors decreases the overall cost of the power steering system.

SUMMARY OF THE INVENTION AND ADVANTAGES

The subject invention provides a method of determining a direction of a power boost applied to a power cylinder in a power steering system. The power steering system is coupled to a hand wheel and further includes a pump, a control valve in fluid communication with and disposed between the pump and the power cylinder, a fluid circulating through the power steering system, and a pressure sensor disposed between the pump and the control valve. The method comprises the steps of defining an equilibrium pressure range of the fluid. The equilibrium pressure range indicates a state when the fluid is circulating through the power steering system without providing the power boost, i.e., while providing equal fluid pressure to both a first fluid chamber and a second fluid chamber of the power cylinder. The method further comprises measuring a pressure of the fluid between the pump and the control valve; comparing the measured pressure of the fluid to the equilibrium pressure range to determine if the measured pressure of the fluid is within the equilibrium pressure range; detecting a first angular position of the hand wheel in response to the measured pressure being within the equilibrium pressure range; detecting a second angular position of the hand wheel in response to rotation of the hand wheel; subtracting the second angular position of the hand wheel from the first angular position of the hand wheel to obtain a differential value; and evaluating the differential value to determine the direction of the power boost applied to the power cylinder.

Accordingly, the subject invention provides a method of determining the direction of the power boost applied to the power cylinder by utilizing only one pressure sensor placed between the pump and the control valve and a hand wheel sensor. The method eliminates the need for a second pressure sensor while still maintaining all of the capabilities of the prior art systems. The overall cost of the variable effort power steering system is thereby reduced by eliminating the second pressure sensor.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
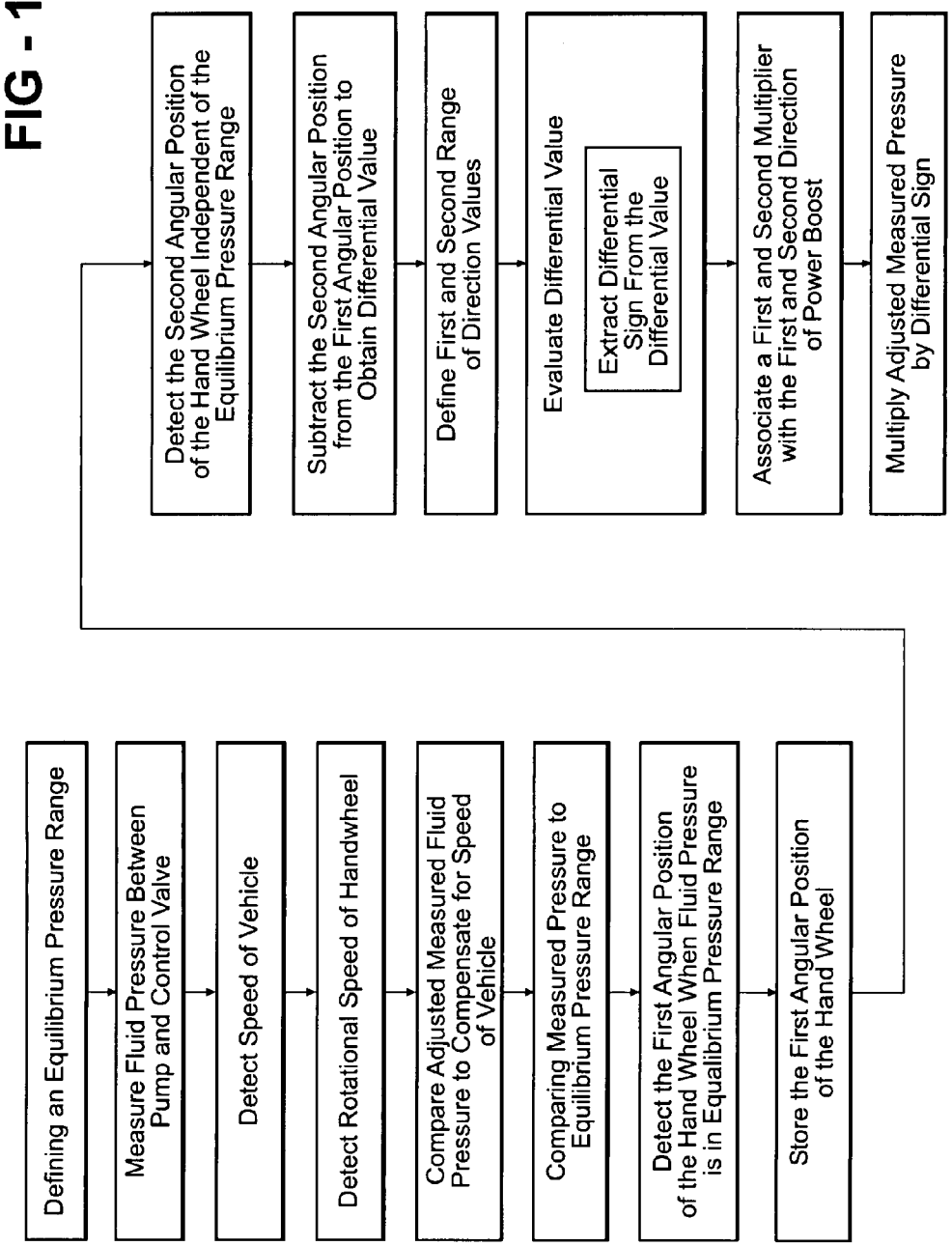
FIG. 1 is a flowchart showing the steps of the disclosed subject invention.

Referring to the Figures, wherein like numerals indicate corresponding parts throughout the several views, a method of determining a direction of a power boost is generally shown in FIG. 1. The method determines the direction of the power boost applied to a power cylinder 20 in a power steering system 22 of a vehicle.

Figure 2:
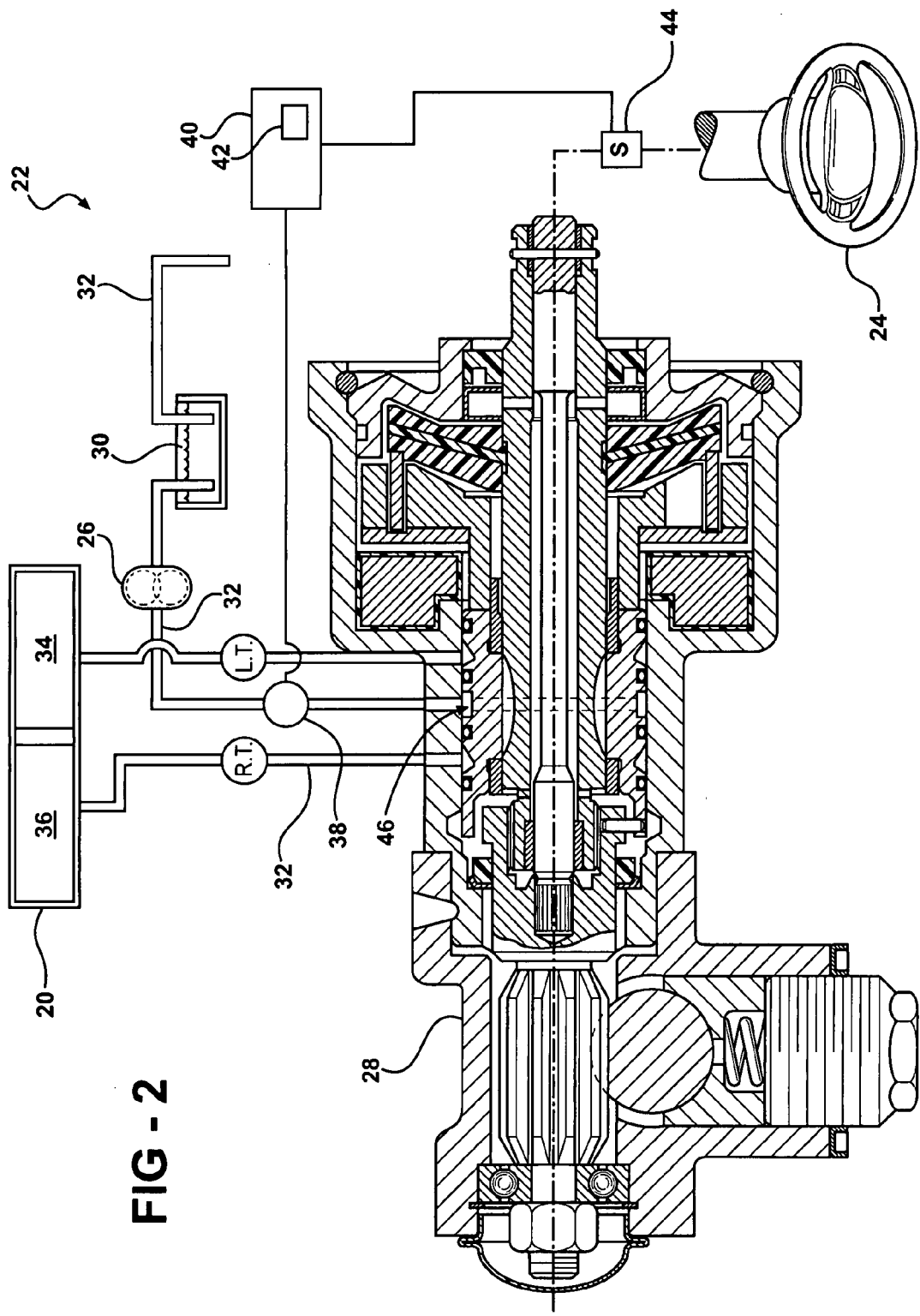
FIG. 2 is a schematic view of a variable effort power steering system.

Referring to FIG. 2, the power steering system 22 is preferably a variable effort power steering system 22. The power steering system 22 is coupled to a hand wheel 24, and further includes a pump 26, a control valve 28 in fluid communication between the pump 26 and the power cylinder 20, and a reservoir 30. The pump 26, the control valve 28, the power cylinder 20, and the reservoir 30 are all interconnected by a plurality of fluid lines 32 with the pump 26 circulating a fluid through the plurality of fluid lines 32 and the rest of the power steering system 22.

The power cylinder 20 is in fluid communication with the control valve 28 and includes a first fluid chamber 34 for providing a power boost in a first direction upon receiving the fluid therein and a second fluid chamber 36 for providing a power boost in a second direction opposite the first direction upon receiving the fluid therein. Accordingly, the method disclosed in the subject invention determines the direction of the power boost applied to the power cylinder 20, i.e., which one of the first fluid chamber 34 and the second fluid chamber 36 the power boost is directed toward.

The control valve 28 is disposed between the pump 26 and the power cylinder 20, and regulates a flow of the fluid into the first fluid chamber 34 to assist steering maneuvers in the first direction and the second fluid chamber 36 to assist steering maneuvers in the second direction. The control valve 28 may include any standard control valve 28 suitable for use in a variable effort power steering system 22. An example of a suitable control valve 28 is disclosed in the parent of this application, U.S. Published Patent Application 2006/0249326A1, Ser. No. 11/122,337, published on Nov. 9, 2006.

A pressure sensor 38 is disposed between the pump 26 and the control valve 28, and is preferably disposed adjacent the control valve 28, i.e., nearer the control valve 28 than the pump 26. Preferably, the pressure sensor 38 senses a fluid pressure between the pump 26 and the control valve 28. While the pressure sensor 38 is illustrated on the supply line for clarity, it should be understood that the pressure sensor 38 may be arranged to measure supply pressure directly within the groove 46. The pressure sensor 38 may include any suitable sensor capable of sensing a fluid pressure in the power steering system 22.

The power steering system 22 further comprises a controller 40 having a memory 42. The controller 40 may include an onboard computer commonly installed in vehicles. Alternatively, some other suitable computer, such as a lap top computer, may also be utilized. The controller 40 is in communication with the pressure sensor 38, and receives a signal from the pressure sensor 38 indicating the fluid pressure between the pump 26 and the control valve 28. Methods of connecting the pressure sensor 38 and the controller 40 are commonly known in the art and are not described herein.

A hand wheel sensor 44 is connected to the hand wheel 24, and senses a position of the hand wheel 24. Preferably, the hand wheel sensor 44 is disposed nearer a steering rack of the vehicle to minimize the effects of lash on the system. However, it should be appreciated that the hand wheel sensor 44 may be positioned at any location on the steering system, including in a steering column near the hand wheel 24.

The hand wheel sensor 44 is also in communication with the controller 40, with the controller 40 receiving a signal from the hand wheel sensor 44 indicating the position of the hand wheel 24. The hand wheel sensor 44 may include any suitable sensor capable of sensing the direction of movement of the hand wheel 24 from an on-center orientation as well as sensing the cumulative rotation of the hand wheel 24 measured from the on-center orientation. The on-center orientation of the hand wheel 24 is the position of the hand wheel 24 when the wheels of the vehicle are directed straight ahead, i.e., the on-center orientation corresponds to a static non turning condition of the vehicle. Methods of connecting the hand wheel sensor 44 and the controller 40 are commonly known in the art and are not described herein. The memory 42 of the controller 40 stores the signal from the pressure sensor 38 and the signal from the hand wheel sensor 44.

The power steering system 22 further includes a vehicle speed sensor to sense a speed of the vehicle and a hand wheel sensor 44 to sense a speed of the hand wheel 24, i.e., the speed at which the hand wheel 24 is turned. The vehicle speed sensor is in communication with the controller 40. The controller 40 receives a signal from the vehicle speed sensor indicating the speed of the vehicle. The vehicle speed sensor may include any suitable sensor capable of sensing the speed of the vehicle, such as is typically installed in vehicles. The hand wheel 24 speed sensor is also in communication with the controller 40. The controller 40 receives a signal indicating the rotational speed of the hand wheel 24. The hand wheel 24 speed sensor may include any suitable sensor capable of sensing the rotational speed of the hand wheel 24.

Referring to FIG. 1, the method of determining the direction of the power boost by the single pressure sensor 38 and the hand wheel sensor 44 is described. In this method, the maximum system back pressure (used as the "reference point") is monitored, and subtracted from the absolute fluid pressure reading obtained from the pressure sensor 38 to calculate the net fluid pressure. The net pressure is then multiplied by a differential sign of the steering wheel angle. For example: if the back pressure is fifty pounds per square inch (50 psi), and the pressure sensor 38 reads one hundred eighty pounds per square inch (180 psi), then the net fluid pressure would be 180-50, or positive one hundred thirty pounds per square inch (130 psi) for positive steering wheel angles, and negative one hundred thirty pounds per square inch (−130 psi) for negative steering wheel angles.

The method comprises the steps of defining an equilibrium pressure range of the fluid. The equilibrium pressure range of the fluid is defined to indicate a state when the fluid is circulating through the power steering system 22 without providing the power boost to the power cylinder 20. The equilibrium pressure range indicates when no steering maneuver is being performed. Accordingly a fluid pressure reading within the equilibrium pressure range indicates that no steering maneuver is being performed, while a fluid pressure outside the equilibrium pressure ranged indicates that a steering maneuver is currently being performed.

Figure 3:
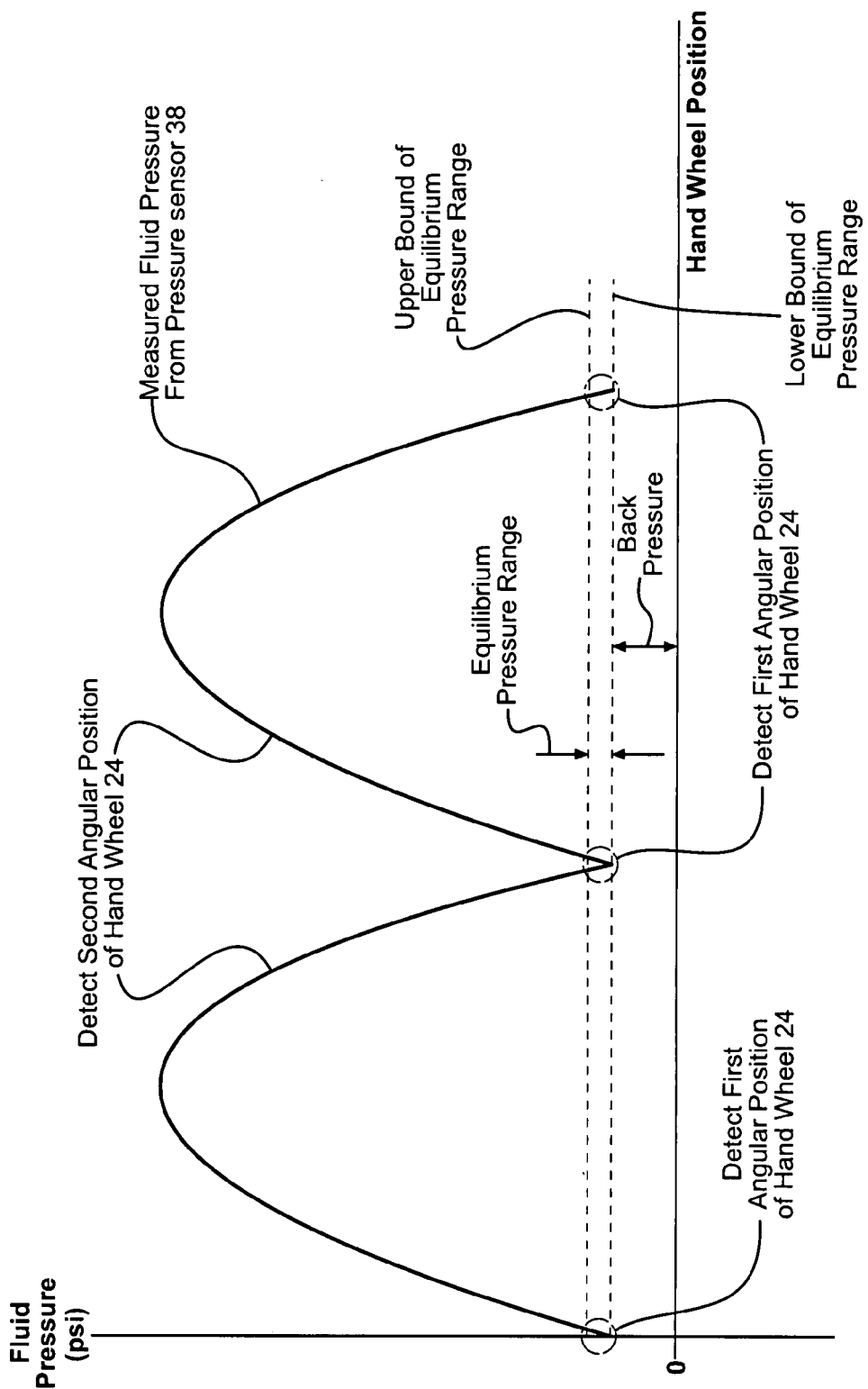
FIG. 3 is a graph illustrating the disclosed subject invention.

Referring to FIG. 3, there is always a back pressure in the power steering system 22 between the pump 26 and the control valve 28. This back pressure is present even when no steering maneuver is being performed. The back pressure may vary, but is typically near fifty pounds per square inch (50 psi). Because the back pressure is always present in the power steering system 22, the equilibrium pressure range is set to define an upper bound and a lower bound. Preferably, the lower bound of the equilibrium pressure range is set to equal zero pounds per square inch (0 psi) and the upper bound of the equilibrium pressure range is set to equal two hundred pounds per square inch (200 psi). More preferably, the lower bound of the equilibrium pressure range is set equal to or as close as possible to the value of the back pressure in the power steering system 22. As the back pressure is typically near fifty pounds per square inch (50 psi), the lower bound of the equilibrium pressure range is more preferably set to equal fifty pounds per square inch (50 psi), and the upper bound of the equilibrium pressure range is more preferably set equal to one hundred fifty pounds per square inch (150 psi). It should be understood that the equilibrium pressure range may vary, and that the lower bound of the equilibrium pressure range should correspond to a situation in which no steering maneuver is performed. It should also be understood that the equilibrium pressure range may also be defined as equal to a pre-determined value, such as the value of the back pressure in the power steering system 22, and does not include an actual range of values.

The method further comprises measuring a pressure of the fluid between the pump 26 and the control valve 28. The measured pressure of the fluid is an absolute value and is compared to the equilibrium pressure range to determine if the measured pressure of the fluid is within the equilibrium pressure range. As described above, a measured pressure within the equilibrium pressure range indicates that no steering maneuver is currently being performed. It should be understood that the state of the power steering system 22 in which no steering maneuver is being performed corresponds with no rotation of the hand wheel 24, as measured by the hand wheel sensor 44, or of the wheels of the vehicle. The fluid pressure is a function of a speed of the vehicle and of a rotational speed of the hand wheel 24. In general, the fluid pressure is higher at low speeds and is also generally higher at high rotation speeds of the hand wheel.

The system back pressure is always present on both sides of the power cylinder 20, i.e., to both the first fluid chamber 34 and the second fluid chamber 36. At low speeds, the system back pressure is often different than at high speeds. Additionally, at low speeds, the power boost can also be in either direction regardless of the position of the hand wheel 24, which is generally not the situation at high speeds. Accordingly, in order to determine the direction of the power boost for low vehicle speeds, the measured pressure of the fluid is made dependent upon the speed of the hand wheel 24. Accordingly, the method further comprises the steps of detecting the speed of the vehicle and of detecting the rotational speed of the hand wheel 24. The method further comprises the step of adjusting the measured pressure of the fluid to compensate for the detected speed of the vehicle based on the detected rotational speed of the hand wheel 24. One method of adjusting the measured pressure of the fluid includes defining a low speed table of pressure values for low vehicle speeds, such as below 10 mph, and a high speed table of pressure values for high vehicle speeds, such as above 70 mph. A table of blend values is utilized for vehicle speeds between the vehicle speeds utilized in the low speed table of pressure values and the high speed table of pressure values, such as between 10 mph and 70 mph.

The low speed table of pressure values and the high speed table of pressure values are indexed by the rotational speed of the hand wheel to correlate to an appropriate adjusted measured pressure. The table of blend values operates as follows: the vehicle speed indexes into the table of blend values to look up a blend factor. For example, a vehicle speed of 40 mph may correlate to a blend factor of 0.3. An algorithm in the controller 40 takes 30% of the appropriate pressure value from the low speed table of pressure values at the measured rotational speed of the hand wheel 24, and adds that value to 70% (1-blend factor, i.e., 1-0.3 or 70%) of the appropriate pressure value from the high speed table of pressure values at the measured rotational speed of the hand wheel 24 to obtain a resultant representing the adjusted measured pressure at 40 mph. It should be understood that the blend factor is a first percentage which is applied to the low speed table of pressure values as described above. A second percentage is obtained by subtracting the first percentage from 1, e.g., 1-0.30=0.70 (70%). The second percentage is applied to the high speed table of pressure values as described above.

Based on the detected speed of the vehicle, the controller 40 references either the low speed table of pressure values, the high speed table of pressure values, or both the low speed and high speed table of pressure values and the table of blend values to obtain the adjusted measured pressure as described above. The adjusted measured pressure of the fluid compensates for the effects of a low vehicle speed on the power steering system 22. The adjusted measured pressure of the fluid is then compared to the equilibrium pressure range as described above to determine if the adjusted measured pressure is within the equilibrium pressure range. Accordingly, reference to the measured pressure of the fluid within this specification may include either the absolute value of the measured pressure or the adjusted measured pressure of the fluid. It should be appreciated that the measured pressure of the fluid may be adjusted to account for the speed of the vehicle by some other method not specifically describe described herein.

The method further comprises detecting a first angular position of the hand wheel 24 in response to the measured pressure being within the equilibrium pressure range. The first angular position of the hand wheel 24 is then stored in the memory 42 of the controller 40 to be utilized in later steps. Accordingly, the method further comprises the step of re-detecting and re-storing in the memory 42 of the controller 40 the first angular position of the hand wheel 24 every instance the measured fluid pressure moves into the equilibrium pressure range from outside the equilibrium pressure range.

The step of detecting a first angular position of the hand wheel 24 further includes the steps of detecting the direction of rotation of the hand wheel 24 and assigning a positive value for clockwise rotation of the hand wheel 24. The direction of rotation is measured from the on-center orientation of the hand wheel 24. The method also includes assigning a negative value for counterclockwise rotation of the hand wheel 24, which is also measured from the on-center orientation of the hand wheel 24. Additionally, the step of detecting a first angular position of the hand wheel 24 includes measuring a cumulative rotation of the hand wheel 24 from the on-center orientation of the hand wheel 24 on a sample time basis, i.e., at pre-set time intervals. Because the hand wheel 24 is capable of rotating more than a full rotation both left and right of the on-center orientation, it is necessary to measure the cumulative rotation of the hand wheel 24, i.e., the total rotation. Preferably, the rotation of the hand wheel 24 is measured in degrees, but it should be understood that some other unit of measure may also be utilized to measure the rotation of the hand wheel 24. For example, one and a half (1½) rotations of the hand wheel 24 measured from the on-center orientation is measures as five hundred forty degrees (540°). Likewise, three quarters (¾) of one rotation of the hand wheel 24 measured from the on-center orientation is measured as two hundred seventy degrees (270°).

The method further comprises detecting a second angular position of the hand wheel 24 in response to rotation of the hand wheel 24. The step of detecting a second angular position of the hand wheel 24 is further defined as detecting a second angular position of the hand wheel 24 in response to at least one of movement of the hand wheel 24 or the measured pressure being outside the equilibrium pressure range. Therefore, it should be understood that the second angular position is detected in response to either movement of the hand wheel 24 or the fluid pressure between the pump 26 and the control valve 28 being outside the equilibrium pressure range. It should be also understood that the second angular position of the hand wheel 24 may also be measured continuously in response to movement of the hand wheel 24 or the fluid pressure being outside the equilibrium pressure range. The second angular position is therefore not limited to a singular position measurement and may include an ongoing continuous measurement to continuously monitor the position of the hand wheel 24 over time.

Similar to the step of detecting the first angular position of the hand wheel 24, the step of detecting a second angular position of the hand wheel 24 further includes the steps of detecting the direction of rotation of the hand wheel 24 and assigning a positive value for clockwise rotation of the hand wheel 24. The direction of rotation is measured from the on-center orientation of the hand wheel 24. The method further includes assigning a negative value for counterclockwise rotation of the hand wheel 24 measured from the on-center orientation of the hand wheel 24. Additionally, the step of detecting a second angular position of the hand wheel 24 includes measuring a cumulative rotation of the hand wheel 24 from the on-center orientation of the hand wheel 24.

The method further comprises subtracting the second angular position of the hand wheel 24 from the first angular position of the hand wheel 24 to obtain a differential value. It should be understood that the differential value is the arithmetic difference obtained from subtracting the second angular position from the first angular position. For example, assuming the first angular position is equal to negative one hundred eighty degrees (−180°) and the second angular position is equal to positive five hundred forty degrees (+540°), then the differential value is equal to negative seven hundred twenty degrees (−720°). Similarly, assuming the first angular position is equal to positive seventy degrees (+70°) and the second angular position is equal to positive forty degrees (+40°), then the differential value is equal to positive thirty degrees (+30°).

The method further comprises evaluating the differential value to determine the direction of the power boost applied to the power cylinder 20. The step of evaluating the differential value further includes extracting a differential sign from the differential value. The differential sign is a signal, either a positive sign or a negative sign that determines whether the differential value is greater than zero or less than zero. The positive differential sign indicates the differential value is greater than zero, and the negative differential sign indicates the differential value is less than zero.

The differential sign is extracted from the differential value by defining a first range of direction values greater than zero (0), i.e., positive values, and defining a second range of direction values less than zero (0), i.e., negative values. The step of extracting the differential sign further includes comparing the differential value to the first range of direction values and the second range of direction values to determine which one of the first range of direction values and the second range of direction values the differential value is within. A differential value within the first range of direction values includes a positive differential sign and a value within the second range of direction values includes a negative differential sign. For example, assuming a differential value equal to negative seven hundred twenty degrees (−720°), the differential value is compared to the first and second ranges of direction values. Because the second range of direction values is defined to include all numbers less than zero (0), the differential value is within the second range of direction values, and therefore the differential sign is a negative sign. Likewise, assuming a differential value equal to positive thirty degrees (+30°), the differential value is within the first range of direction values, and therefore the differential sign is a positive sign.

The differential sign is correlated to represent the direction of power boost. Specifically, the first range of direction values having the positive differential sign represents a first direction of the power boost, and the second range of direction values having the negative differential sign represents a second direction of the power boost. Referring back to the step of detecting the first and second angular positions, clockwise rotation of the hand wheel 24 was assigned a positive value and counterclockwise rotation was assigned a negative value. With this in mind, the first direction of the power boost correlates to a right turn of the vehicle, i.e., the positive differential sign correlates to the right turn of the vehicle. Similarly, the second direction of the power boost correlates to a left turn of the vehicle, i.e., the negative differential sign correlates to the left turn of the vehicle. It should be understood that the differential sign may be extracted in some other manner and still fall within the scope of the claims. This process is repeated every time the fluid pressure enters the equilibrium pressure range in order to re-detect and store the first angular position at the time the fluid pressure enters the equilibrium pressure range.

Accordingly, assuming the differential value is equal to negative seven hundred twenty degrees (−720°) and as described above includes a negative differential sign; the controller 40 correlates the negative differential sign with the left turn steering maneuver. As such, the controller 40 then determines which of the first or second fluid chambers 34, 36 of the power cylinder 20 the control valve 28 is directing the power boost into to assist in the left turn steering maneuver. Likewise, assuming the differential value is equal to positive thirty degrees (+30°) and as described above includes a positive differential sign; the controller 40 correlates the positive differential sign with the right turn steering maneuver. As such, the controller 40 determines which of the first or second fluid chambers 34, 36 of the power cylinder 20 the control valve 28 is directing the power boost into to assist in the right turn steering maneuver. The controller 40 may also utilize the determined direction of the power boost for other functions related to operation of the variable effort power steering system 22 that are not discussed herein.

The method further comprises the step of associating a first multiplier with the positive differential sign and a second multiplier with the negative differential sign. The step of associating a first multiplier with the positive differential sign and a second multiplier with the negative differential sign is further defined as associating a first multiplier having a value equal to positive one (+1) with the positive differential sign and associating a second multiplier having a value equal to negative one (−1) with the negative differential sign.

The method further comprises the step of multiplying the first multiplier by the measured pressure when the direction of the power boost is in the first direction and multiplying the second multiplier by the measured pressure when the direction of the power boost is in the second direction to obtain a directional magnitude of the power boost. Accordingly, the directional magnitude of the power boost represents both the direction and magnitude of the power boost. For example, assuming the power boost is being applied in the first direction, i.e., the positive differential sign correlating to the right turn steering maneuver, the system back pressure is equal to fifty pounds per square inch (50 psi), and the absolute measured pressure of the fluid is equal to one hundred seventy pounds per square inch (170 psi), then the net fluid pressure is equal to one hundred twenty pounds per square inch (120 psi) and the directional magnitude of the power boost would equal positive one hundred twenty pounds per square inch (+120 psi). Similarly, assuming the power boost is being applied in the second direction, i.e., the negative differential sign correlating to the left turn steering maneuver, the system back pressure is equal to fifty pounds per square inch (50 psi), and the absolute measured pressure is equal to one hundred seventy pounds per square inch (170 psi), then the directional magnitude of the power boost would equal negative one hundred twenty pounds per square inch (−120 psi). The controller 40 utilizes the directional magnitude of the power boost in other calculations to effect changes in the control valve 28 to modify the required steering effort in the variable effort power steering system 22.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of determining a direction of a power boost applied to a power cylinder in a power steering system coupled to a hand wheel with the power steering system further including a pump, a control valve in fluid communication with and disposed between the pump and the power cylinder, a fluid circulating through the power steering system, and a pressure sensor disposed between the pump and the control valve, said method comprising the steps of:

defining an equilibrium pressure range of the fluid to indicate when the fluid is circulating through the power steering system without providing the power boost;

measuring a pressure of the fluid between the pump and the control valve;

comparing the measured pressure of the fluid to the equilibrium pressure range to determine if the measured pressure of the fluid is within the equilibrium pressure range;

detecting a first angular position of the hand wheel in response to the measured pressure being within the equilibrium pressure range;

detecting a second angular position of the hand wheel in response to rotation of the hand wheel;

subtracting the second angular position of the hand wheel from the first angular position of the hand wheel to obtain a differential value;

evaluating by a controller, the differential value to determine the direction of the power boost applied to the power cylinder; and controlling the power steering system based on the direction.

2. A method as set forth in claim 1 wherein the step of evaluating the differential value includes extracting a differential sign from the differential value.

3. A method as set forth in claim 2 wherein the step of extracting the differential sign includes defining a first range of direction values greater than zero (0) and defining a second range of direction values less than zero (0).

4. A method as set forth in claim 3 wherein the step of extracting the differential sign further includes comparing the differential value to the first range of direction values and the second range of direction values to determine which one of the first range of direction values and the second range of direction values the differential value is within.

5. A method as set forth in claim 4 further comprising the step of correlating a positive differential sign with the first range of direction values and a negative differential sign with the second range of direction values.

6. A method as set forth in claim 5 further comprising the step of correlating a first direction of the power boost with the positive differential sign and a second direction of the power boost with the negative differential sign.

7. A method as set forth in claim 6 further comprising the step of associating a first multiplier with the positive differential sign and a second multiplier with the negative differential sign.

8. A method as set forth in claim 7 further comprising the step of multiplying the first multiplier by the measured pressure when the direction of the power boost is in the first direction and multiplying the second multiplier by the measured pressure when the direction of the power boost is in the second direction to obtain a directional magnitude of the power boost.

9. A method as set forth in claim 7 wherein the step of associating a first multiplier with the first direction of the power boost and a second multiplier with the second direction of the power boost is further defined as associating a first multiplier having a value equal to positive one (+1) with the first direction of the power boost and associating a second multiplier having a value equal to negative one (−1) with the second direction of the power boost.

10. A method as set forth in claim 1 wherein the step of setting an equilibrium pressure range is further defined as setting an equilibrium pressure range between zero pounds per square inch (0 psi) and two hundred pounds per square inch (200 psi).

11. A method as set forth in claim 10 wherein the step of setting an equilibrium pressure range is further defined as setting an equilibrium pressure range between fifty pounds per square inch (50 psi) and one hundred fifty pounds per square inch (150 psi).

12. A method as set forth in claim 1 further comprising the step of re-detecting the first angular position of the hand wheel every instance the measured pressure moves into the equilibrium pressure range from outside the equilibrium pressure range.

13. A method as set forth in claim 1 further including a controller connected to the power steering system and having a memory and further comprising the step of storing the first angular position of the hand wheel in the memory.

14. A method as set forth in claim 1 wherein the step of detecting a first angular position of the hand wheel further includes the steps of detecting the direction of rotation of the hand wheel and assigning a positive value for clockwise rotation of the hand wheel measured from an on-center orientation of the hand wheel and further assigning a negative value for counterclockwise rotation of the hand wheel measured from the on-center orientation of the hand wheel.

15. A method as set forth in claim 14 wherein the step of detecting a first angular position of the hand wheel further includes measuring a cumulative rotation of the hand wheel from the on-center orientation of the hand wheel.

16. A method as set forth in claim 15 wherein the step of measuring a cumulative rotation of the hand wheel is further defined as measuring a cumulative rotation of the hand wheel on a sample time basis.

17. A method as set forth in claim 1 wherein the step of detecting a second angular position of the hand wheel in response to rotation of the hand wheel is further defined as detecting a second angular position of the hand wheel in response to at least one of movement of the hand wheel and the measured pressure being outside the equilibrium pressure range.

18. A method as set forth in claim 1 wherein the step of detecting a second angular position of the hand wheel further includes the steps of detecting the direction of rotation of the hand wheel and assigning a positive value for clockwise rotation of the hand wheel measured from an on-center orientation of the hand wheel and further assigning a negative value for counterclockwise rotation of the hand wheel measured from the on-center orientation of the hand wheel.

19. A method as set forth in claim 18 wherein the step of detecting a second angular position of the hand wheel further includes measuring a cumulative rotation of the hand wheel from the on-center orientation of the hand wheel.

20. A method as set forth in claim 19 wherein the step of measuring a cumulative rotation of the hand wheel is further defined as measuring a cumulative rotation of the hand wheel on a sample time basis.

21. A method as set forth in claim 1 wherein the power steering system is coupled to a vehicle and the method further comprises the step of detecting a speed of the vehicle.

22. A method as set forth in claim 21 further comprising the step of detecting a rotational speed of the hand wheel.

23. A method as set forth in claim 22 further comprising the step of adjusting the measured pressure of the fluid to compensate for the speed of the vehicle with reference to the speed of the hand wheel.

24. A method as set forth in claim 23 wherein the step of comparing the measured pressure of the fluid to the equilibrium pressure range is further defined as comparing the adjusted measured pressure of the fluid to the equilibrium pressure range.

25. A method of determining a direction of a power boost applied to a power cylinder in a power steering system coupled to a hand wheel, comprising:
    defining an equilibrium pressure range of a fluid to indicate when the fluid is circulating through the power steering system without providing the power boost;
    measuring a pressure of the fluid;
    comparing the measured pressure of the fluid to the equilibrium pressure range to determine if the measured pressure of the fluid is within the equilibrium pressure range;
    detecting a first angular position of the hand wheel in response to the measured pressure being within the equilibrium pressure range;
    detecting a second angular position of the hand wheel in response to rotation of the hand wheel;
    subtracting the second angular position of the hand wheel from the first angular position of the hand wheel to obtain a differential value;
    evaluating by a controller, the differential value to determine the direction of the power boost applied to the power cylinder; and controlling the power steering system based on the direction.

* * * * *